(12) United States Patent
Lee et al.

(10) Patent No.: US 11,818,730 B2
(45) Date of Patent: Nov. 14, 2023

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Seunggye Hwang, Seoul (KR); Jaehyung Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 17/647,759

(22) Filed: Jan. 12, 2022

(65) Prior Publication Data
US 2022/0225392 A1    Jul. 14, 2022

(30) Foreign Application Priority Data

Jan. 12, 2021   (KR) .......................... 10-2021-0004227

(51) Int. Cl.
*H04W 72/23*    (2023.01)
*H04W 48/12*    (2009.01)

(52) U.S. Cl.
CPC ........... *H04W 72/23* (2023.01); *H04W 48/12* (2013.01)

(58) Field of Classification Search
CPC .............................. H04W 72/23; H04W 48/12
See application file for complete search history.

(56) References Cited

U.S. PATENT DOCUMENTS

| | | | |
|---|---|---|---|
| 2018/0132244 A1* | 5/2018 | Huang | H04L 5/0094 |
| 2019/0349901 A1* | 11/2019 | Basu Mallick | H04W 72/23 |
| 2021/0058971 A1* | 2/2021 | MolavianJazi | H04W 72/23 |

* cited by examiner

*Primary Examiner* — Charles C Jiang
*Assistant Examiner* — Debebe A Asefa
(74) *Attorney, Agent, or Firm* — LEE HONG DEGERMAN KANG WAIMEY

(57) ABSTRACT

According to an embodiment of the present invention a method of receiving a signal by a user equipment (UE) in a wireless communication system, may comprises: receiving, from a first frequency band of a first cell, a master information block (MIB) as a part of system information of the first cell; receiving, from the first frequency band of the cell, a physical downlink control channel (PDCCH) carrying downlink control information (DCI) in a common search space configured based on the MIB, the DCI including scheduling information for a first system information block (SIB) that is another part of the system information of the first cell; and performing a system information block (SIB) reception based on the DCI.

9 Claims, 12 Drawing Sheets

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2021-0004227 filed on Jan. 12, 2021, the contents of which are all hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

In an aspect of the present invention, a method of receiving a signal by a user equipment (UE) in a wireless communication system, may comprises: receiving, from a first frequency band of a first cell, a master information block (MIB) as a part of system information of the first cell; receiving, from the first frequency band of the cell, a physical downlink control channel (PDCCH) carrying downlink control information (DCI) in a common search space configured based on the MIB, the DCI including scheduling information for a first system information block (SIB) that is another part of the system information of the first cell; and performing a system information block (SIB) reception based on the DCI.

Preferably, the DCI is configured to indicate whether or not the specific type of the UE is supported by the first cell.

Preferably, the SIB reception performed by the UE includes a reception of a second SIB based on whether or not the specific type of the UE is supported by the first cell.

Preferably, only in a state where the DCI indicates that the specific type of the UE is supported by the first cell, the SIB reception includes the reception of the second SIB, and the reception of the second SIB is performed, based on the DCI, in a second frequency band that is not identical to the first frequency band Preferably, the specific type is related to a UE with enhanced coverage or a UE with reduced-capability (RedCap) configured to support a smaller band than a legacy type UE.

Preferably, in the state where the DCI indicates that the specific type of the UE is supported by the first cell, the SIB reception includes the reception of the second SIB, in addition to the first SIB.

Preferably, the first SIB is common for all UE types and the second SIB is a specific type-dedicated SIB.

Preferably, the first SIB includes scheduling information for first remaining SIB s and the second SIB includes scheduling information for second remaining SIBs.

Preferably, the DCI includes information for barring cell-access of the specific type of the UE.

Preferably, the DCI includes time and frequency information for the second SIB.

Preferably, the SIB reception exclude the reception of the first SIB, in the state where the DCI indicates that the specific type of the UE is supported by the first cell.

Preferably, in a state where the DCI indicates that the specific type of the UE is not supported by the first cell, the SIB reception performed by the UE includes neither the reception of the first SIB nor the reception of the second SIB.

According to other aspect of the present invention, a non-transitory computer readable medium recorded thereon program codes for performing the aforementioned method is presented.

According to another aspect of the present invention, the UE configured to perform the aforementioned method is presented.

According to another aspect of the present invention, a device configured to control the UE to perform the aforementioned method is presented.

DETAILED DESCRIPTION

Figure 1:
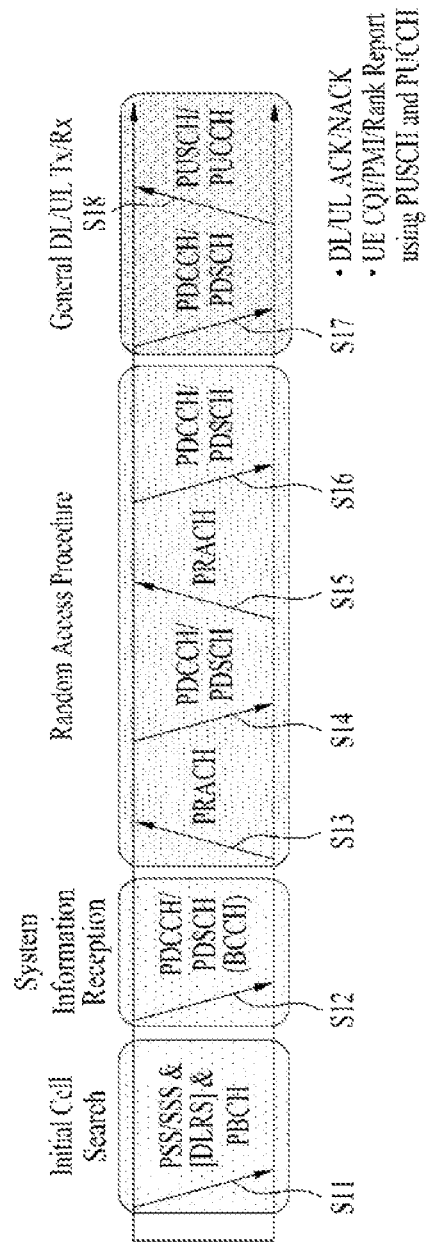
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
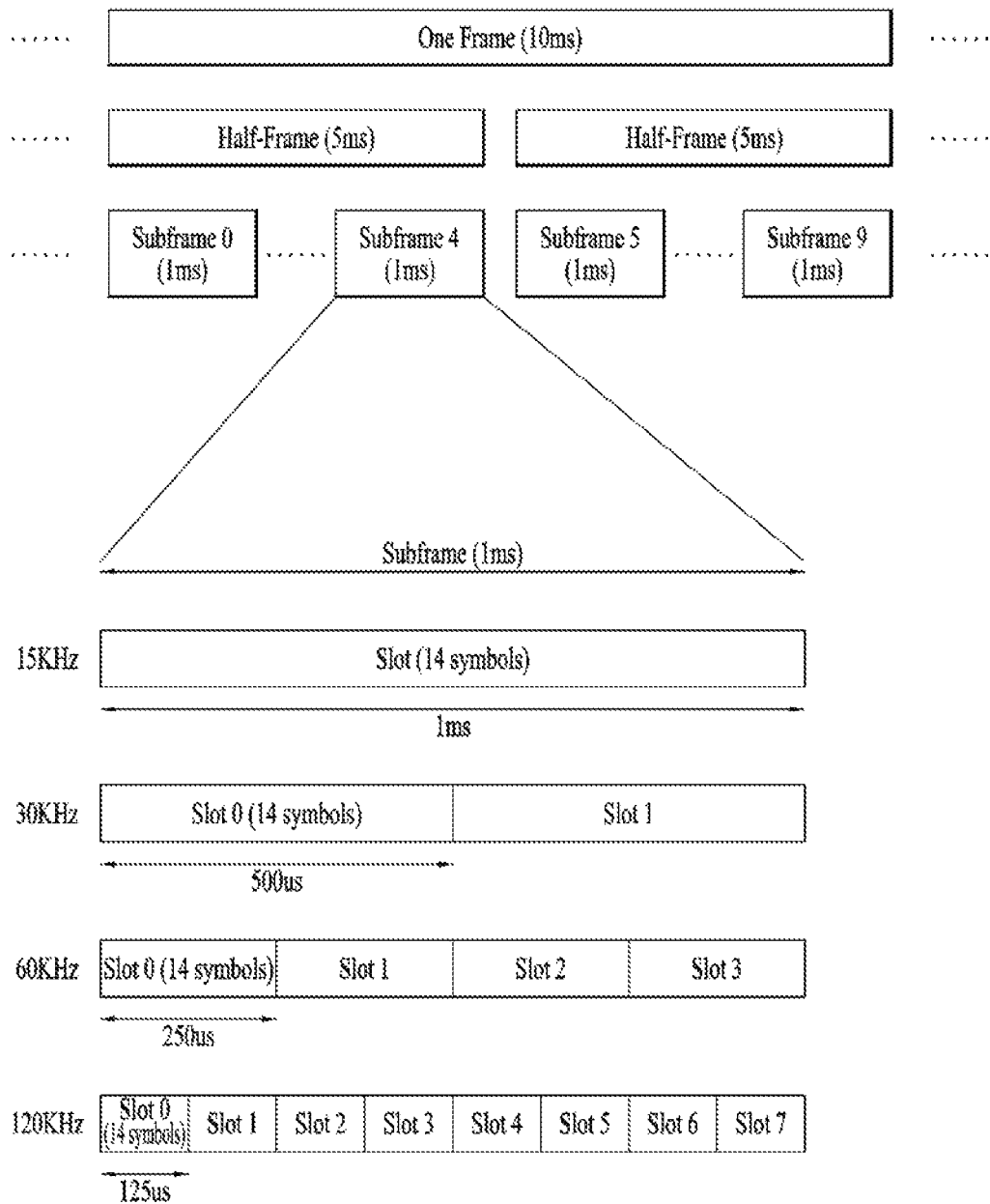
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
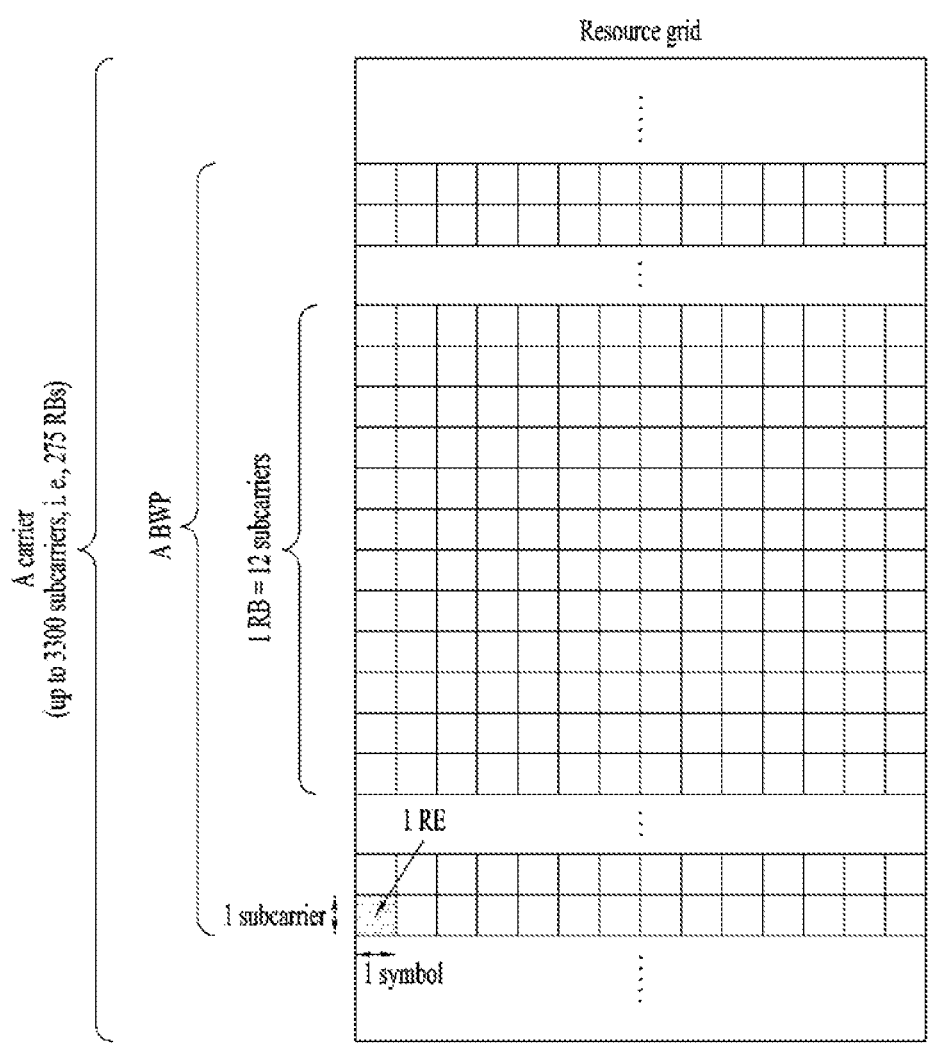
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
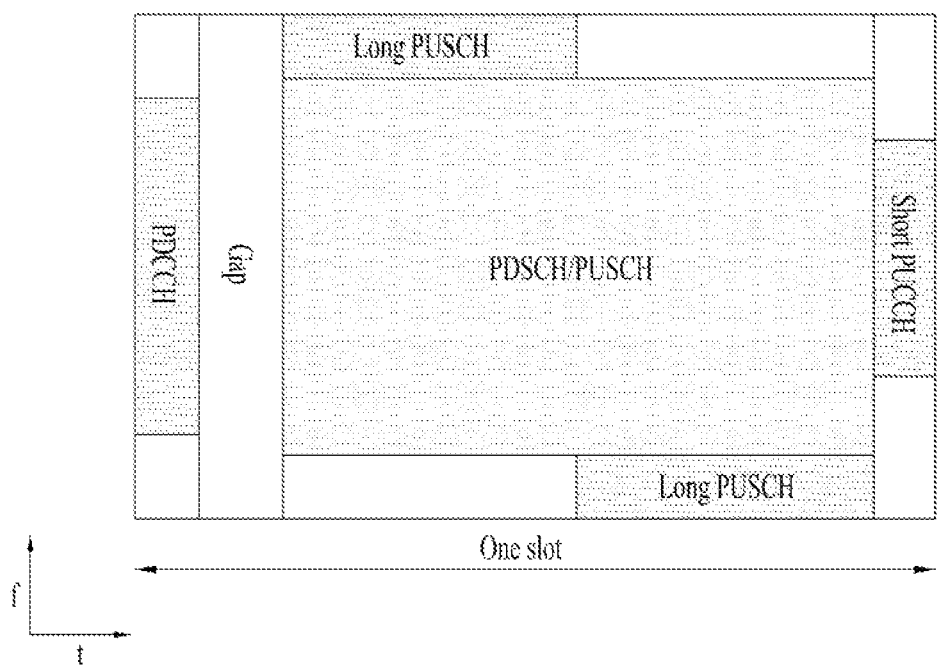
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
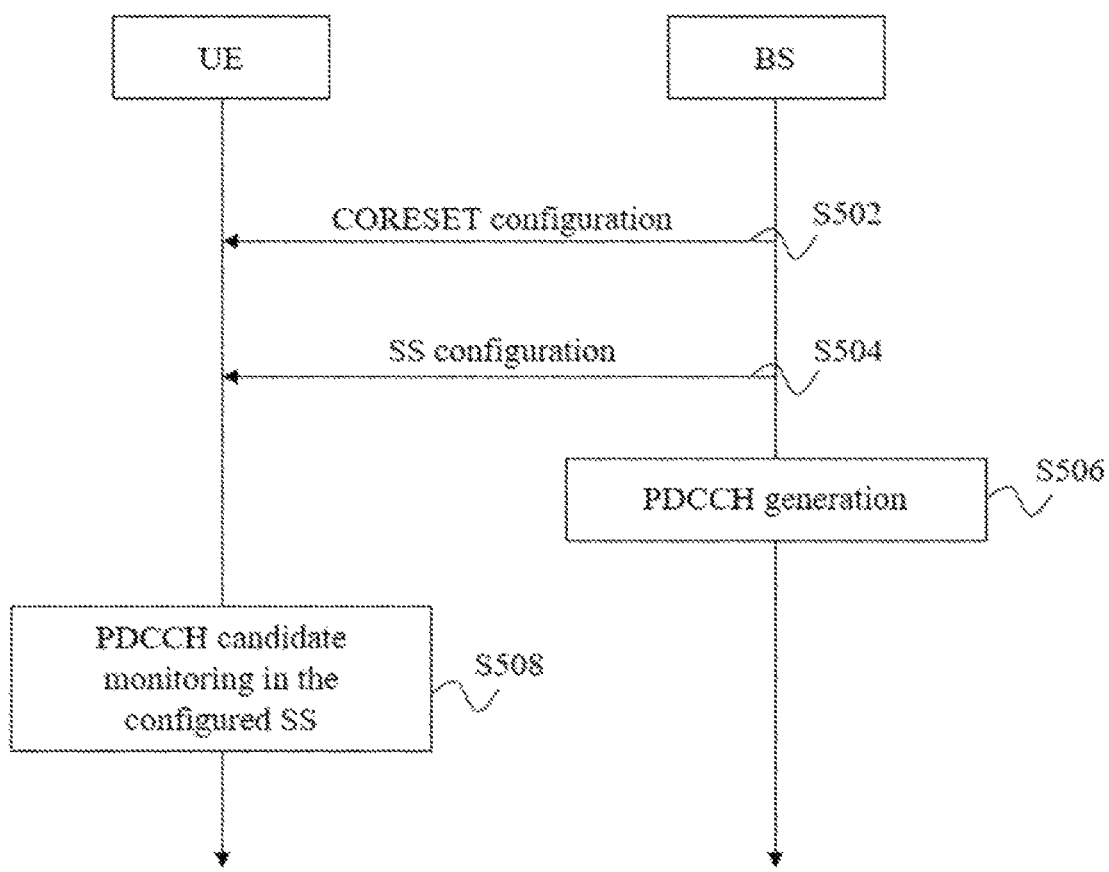
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

- controlResourceSetId: indicates the ID of a CORESET.
- frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
- duration: indicates the time resources of the CORESET. Duration indicates the number of consecutive OFDM symbols included in the CORESET. Duration has a value of 1 to 3.
- cce-REG-MappingType: indicates a control channel element (CCE)-REG mapping type. Interleaved and non-interleaved types are supported.
- interleaverSize: indicates an interleaver size.
- pdcch-DMRS-ScramblingID: indicates a value used for PDCCH DMRS initialization. When pdcch-DMRS-ScramblingID is not included, the physical cell ID of a serving cell is used.
- precoderGranularity: indicates a precoder granularity in the frequency domain.
- reg-BundleSize: indicates an REG bundle size.
- tci-PresentInDCI: indicates whether a transmission configuration index (TCI) field is included in DL-related DCI.
- tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

- searchSpaceId: indicates the ID of an SS.
- controlResourceSetId: indicates a CORESET associated with the SS.
- monitoringSlotPeriodicityAndOffset: indicates a periodicity (in slots) and offset (in slots) for PDCCH monitoring.
- monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
- nrofCandidates: indicates the number of PDCCH candidates (one of values 0, 1, 2, 3, 4, 5, 6, and 8) for each AL where AL={1, 2, 4, 8, 16}.
- searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \le 23$ for FR1 (Frequency Range 1; Sub-6 GHz; 450 to 6000 MHz) and if $k_{SSB} \le 11$ for FR2 (Frequency Range 2; mm-Wave; 24250 to 52600 MHz). The UE determines that a control resource set for Type0-PDCCH common search space is not present if $k_{SSB}>23$ for FR1 and if $k_{SSB}>11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.-SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
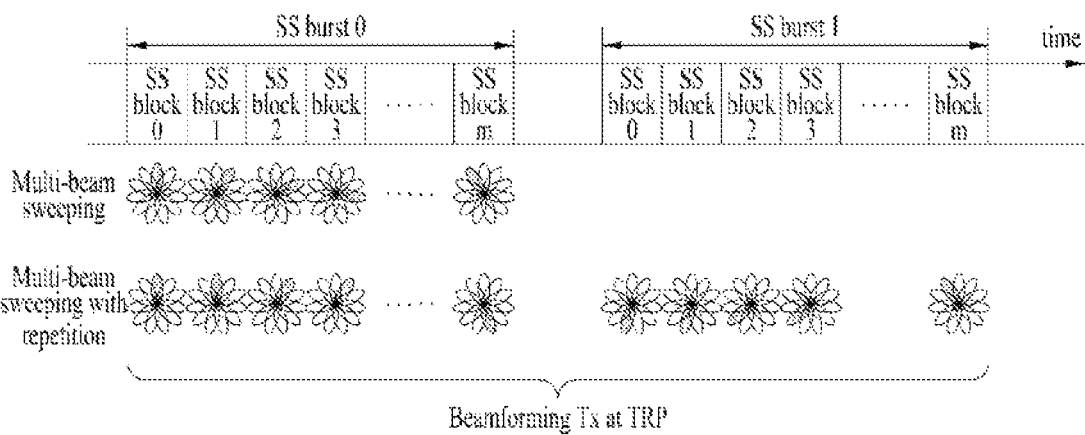
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHz, Max number of beams=4
For frequency range from 3 GHz to 6 GHz, Max number of beams=8
For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
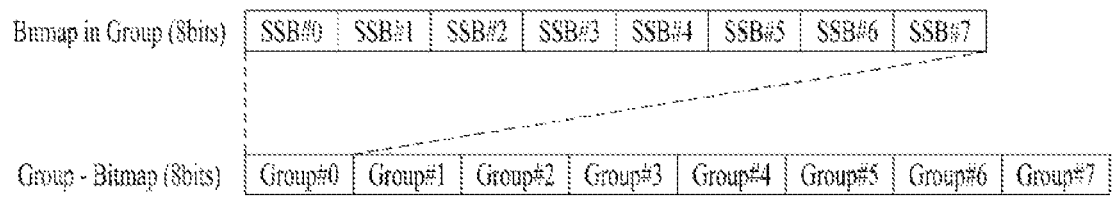
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 In NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
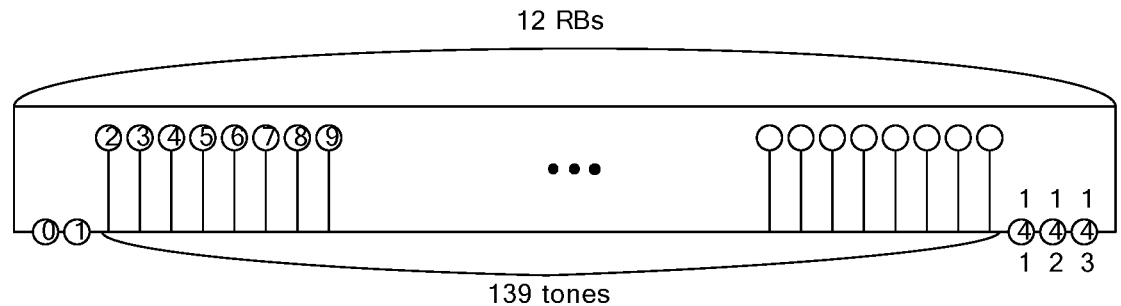
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, $\mu$ is 0. In the case of 30 kHz subcarrier spacing, $\mu$ is 1. Table 5 shows Preamble formats for $L_{RA}=139$ and $\Delta f^{RA}=15 \times 2^\mu$ kHz, where $\mu \in \{0,1,2,3\}$, $\kappa = T_s/T_c = 64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4.9 | 0 | 1 | 6 | 2 |
| 82 | A1 | 1 | 0 | 7.9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4.9 | 0 | 1 | 2 | 6 |
| 128 | A3 | 1 | 0 | 7.9 | 7 | 1 | 1 | 6 |
| 142 | B1 | 1 | 0 | 4.9 | 2 | 1 | 6 | 2 |
| 143 | B1 | 1 | 0 | 7.9 | 8 | 1 | 3 | 2 |
| 221 | A1/B1 | 1 | 0 | 4.9 | 2 | 1 | 6 | 2 |
| 222 | A1/B1 | 1 | 0 | 7.9 | 8 | 1 | 3 | 2 |
| 235 | A2/B2 | 1 | 0 | 4.9 | 0 | 1 | 3 | 4 |
| 236 | A2/B2 | 1 | 0 | 7.9 | 6 | 1 | 2 | 4 |
| 251 | A3/B3 | 1 | 0 | 4.9 | 0 | 1 | 2 | 6 |
| 252 | A3/B3 | 1 | 0 | 7.9 | 2 | 1 | 2 | 6 |

Figure 9:
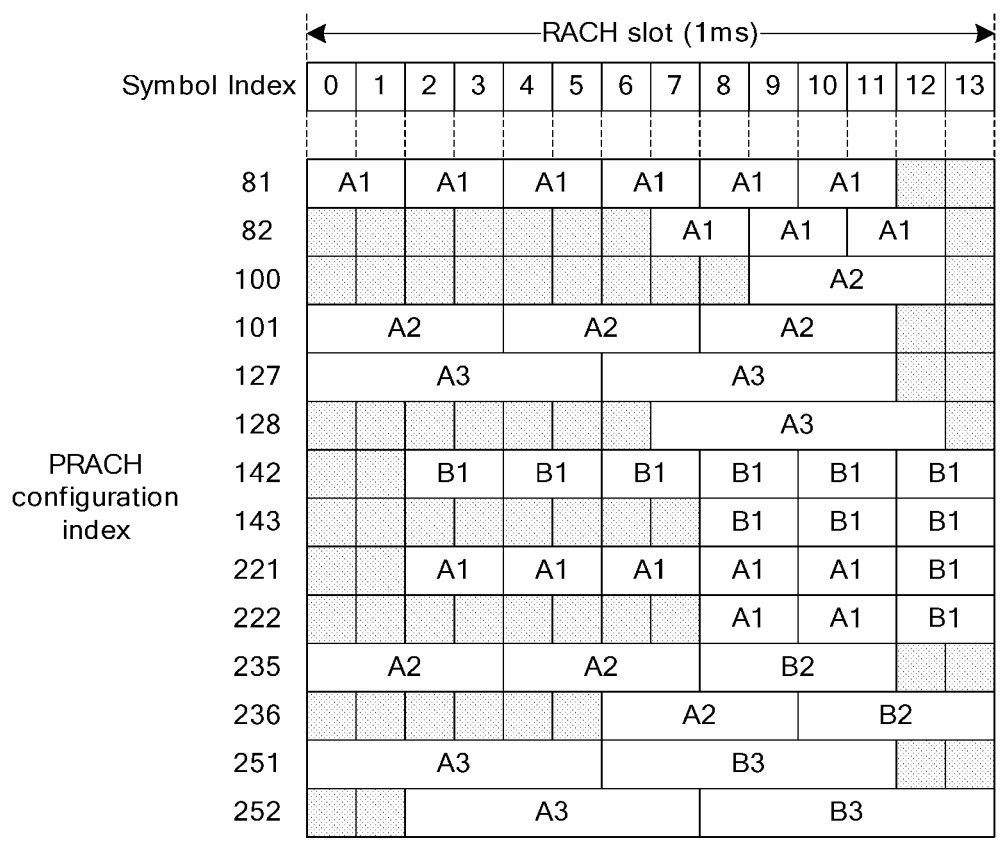
FIG. 9 illustrates an example of a RACH occasion defined in one RACH slot in the NR system.

Referring to Table 6, information about the number of ROs defined in a RACH slot for each preamble format (i.e., $N_t^{RA,\,slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Cell Access of UE with Specific Capability

In general, a UE accessing a cell should support a certain UE capability. For example, in order to access an LTE cell, the UE shall be able to receive the MIB and SIB being broadcast in the cell by the base station. There are several types of SIBs, and since the SIBs can be transmitted through a plurality of PRBs, the UE accessing the LTE cell should have the capability to receive at least 20 MHz Bandwidth.

In order to access the NR cell, first, the UE should be able to receive the MIB through the SSB/PBCH transmitted on the initial DL BWP. And, if the SSB/PBCH can be received, the UE has to check whether the corresponding cell is accessible according to the cell access information included in SIB1. To this end, the UE may check whether a CORE- SET for the Type0-PDCCH common search space (CSS) is provided, based on the MIB. When the Type0-PDCCH common search space exists, the UE determines CORSET #0 and a PDCCH opportunity based on information in the MIB (e.g., pdcch-ConfigSIB1). And SIB1 is received through the PDSCH indicated by the PDCCH received at the corresponding PDCCH opportunity.

Upon receiving the SIB, the UE needs to check various information to determine whether the UE can access the cell, and if some information does not satisfy the condition, the UE determines that the UE is not allowed to access the cell. For example, the maximum uplink bandwidth supported by the UE has to be greater than or equal to the bandwidth of the initial UL BWP, and the maximum downlink bandwidth supported by the UE should be greater than or equal to the bandwidth of the initial DL BWP. If not satisfied, the corresponding cell is determined to be an access-prohibited cell.

A new type of UE with Reduced Capability will be supported by Rel. 17 NR standard. In this application, the reduced capability will be referred to as R-UE. Meanwhile, new features such as coverage enhancement scheme is under discussion for NR standard. In this application, the UE supporting the new features such as enhanced coverage can be referred to as enhanced-UE (E-UE). A UE other than the R-UE and/or E-UE can be referred to as a Normal UE (N-UE) (e.g., legacy UE) for convenience. Hereafter, R/E-UE may refer to either or both R-UE and/or E-UE or an UE having a specific feature(s).

If the R/E-UE supports reduced UE capability than the N-UE, a problem may occur in the cell access process. For example, the R/E-UE may not receive the MIB through the initial DL BWP of the existing NR cell. Even though the R/E-UE could receive the MIB, the R/E-UE may not receive the PDCCH scheduling CORSET #0 or SIB1. The R/E-UE may have a maximum uplink bandwidth or a maximum downlink bandwidth smaller than the bandwidth of the initial BWP supported by existing NR cells. Or, due to the numerology (SCS) of the initial BWP of the existing cell, a paging message transmitted by the base station cannot be received by the R/E-UE or the uplink RACH transmission for initial access cannot be performed. To this end, a general NR cell may be an access-prohibited cell for R/E-UE.

For R/E-UE trying to camps on the cell, it is desirable to early indicate whether the R/E-UE is allowed to access to the cell. Considering a PDSCH broadcasting SIB1 of a cell is scheduled through DCI where its CRC is scrambled with SI-RNTI, it is possible to indicate whether a corresponding cell supports an R/E-UE or a specific feature(s) (e.g., coverage recovery function) through reserved bit(s) of DCI. However, depending on a previous reserved bit configuration/usage by an existing base station, the R/E-UE may misinterpret the reserved bit(s) of the DCI. Therefore, there may be a problem that R/E-UE misinterprets the cell of the legacy base station as supporting an R/E-UE.

Therefore, according to an embodiment of the present invention, in a case where an R/E-UE with a specific capability and/or a UE with a specific feature performs an initial cell access, a method is provided for the R/E-UE to receive additional information through a reserved bit(s) while maintaining an existing PDCCH monitoring period. In particular, in a case where the R/E-UE receives system information, additional information is obtained by using reserved bit(s) of DCI for scheduling system information (e.g., SIB1). R/E-UE may determine whether access to the cell is allowed based on the additional information, or the additional information may be used for providing the R/E-UE of scheduling information for system information necessary for the R/E-UE.

In the present invention, R/E-UE may related to one or more UE types among a plurality of UE types. In addition, the specific feature(s) may include a function for one or more coverage recovery, relaxed processing time, and bandwidth limitations.

In an embodiment of the present invention, when the R/E-UE cannot receive the legacy SIB1, or the legacy SIB1 does not configured for the R/E-UE, or the R/E-UE has to receive additional R/E-UE dedicated/specific information in addition to the legacy SIB1 information, the R/E-UE may receive a new SIB1. In this way, SIB1 (e.g., separate new SIB1) that can be received by the R/E-UE is denoted as R-SIB1 for convenience. R-SIB1 may include all or part of configuration information included in the legacy SIB1, and may also include configuration information dedicated to R/E-UE. The N-UE does not receive R-SIB1. However, if R-SIB1 is not provided, the R/E-UE may receive the legacy SIB1. In this case, the R/E-UE may also receive additional transmission of the legacy SIB1 (e.g., additional transmissions for coverage enhancement).

In this case, from the view of the base station, a cell should simultaneously operate two types of SIB is (i.e., SIB1 and R-SIB1). One type of MIB is mapped to both types of SIB1s, or the MIB is mapped to the legacy SIB1, and the legacy SIB1 may be mapped to R-SIB1. Legacy SIB1 and R-SIB1 may include scheduling information (e.g., RRC parameter schedulingInfoList) that informs whether other SIBs are broadcast or not and the transmission periods of other SIBs.

An R/E-UE may need to receive additional SIB1 which is not received in the N-UE. For example, when the R/E-UE supports a smaller number of receive antennas than the N-UE or when cell coverage needs to be extended, the base station can provide SIB1 transmission by configuring additional time period for the R/E-UE.

Figure 10:
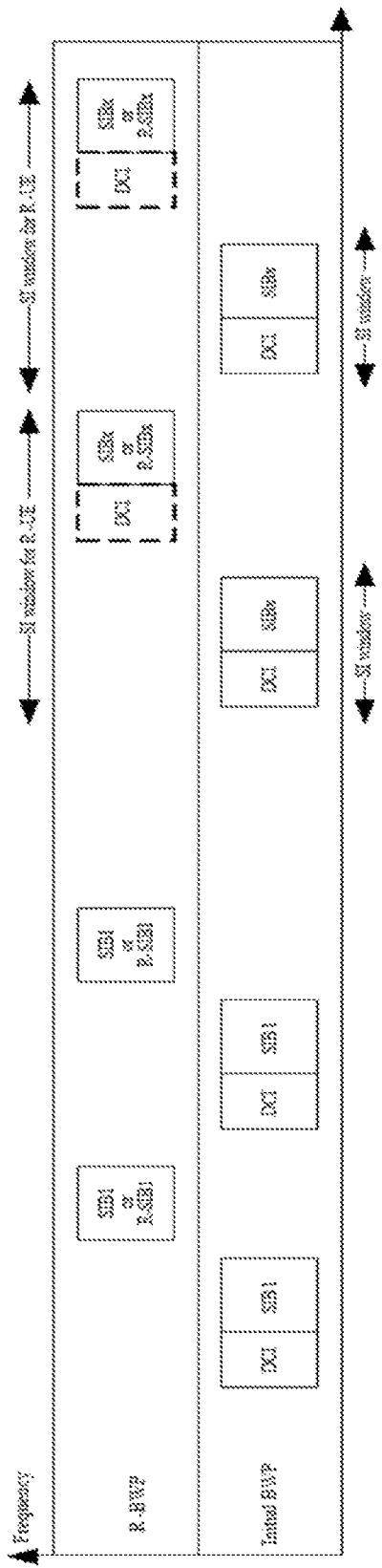
FIG. 10 illustrates SIB1 transmission and reception according to an embodiment of the present invention.

FIG. 10 illustrates SIB1 transmission and reception according to an embodiment of the present invention. In the example of FIG. 10, DCI for SIB1 be CRC scrambled with SI-RNTI. All the (existing) N-UE and the R/E-UE may receive the same DCI. More specifically, FIG. 10 illustrates an example of DCI bit flipping and repeated SIB transmissions through PDSCH for N-UE, R/E-UE. In FIG. 10, the hatched DCI indicates a DCI having reserved bit (s) where bit flipping is applied.

In FIG. 10, it is assumed that SIB1 of Initial BWP is transmitted through TB1. And SIB1 or R-SIB1 of R-BWP is transmitted through TB2. The N-UE receives only TB1. The R/E-UE may receive only TB2 or both TB1 and TB2. Here, Initial BWP and R-BWP may be the same or different BWPs. Also, TB1 and TB2 are the same or different TBs. DCI may be configured to indicate whether TB1 and TB2 are the same or different from each other.

In a case where TB1 and TB2 are the same TB, the R/E-UE may perform decoding by performing L1 soft combining of TB1 and TB2. Alternatively, the R/E-UE may separately decode TB1 and TB2, select one of TB1 or TB2 in MAC or Layer 2, and discard the other one (i.e., a TB not selected in MAC/L2).

In a case where TB1 and TB2 are different TBs, R/E-UE decodes TB1 and TB2 separately, then may combine/concatenate the decoded TB1 and TB2 to obtain one SIB1 or R-SIB1.

The DCI may include at least part of the following information:

Frequency domain resource assignment

Time domain resource assignment—4 bits

VRB-to-PRB mapping—1 bit

Modulation and coding scheme—5 bits

Redundancy version—2 bits

System information indicator—1 bit

Reserved bits—17 bits for operation in a cell with shared spectrum channel access; otherwise 15 bits Here, the base station may transmit at least part of the following additional information through Y bits from X reserved bits in the DCI (e.g., X=17 or 15 bit).

cellBarred intraFreqReselection

System information indicator for R/E-UE

BWP-id for REDCAP UEs (Extended/Additional) SI window length for R/E-UE

Additional frequency domain resource assignment

Additional time domain resource assignment

DCI-to-PDSCH (TB2) slot offset

The DCI-to-PDSCH (TB2) slot offset field may indicate a slot offset between DCI and TB2. When the cellBarred field is set to 'barred', an R/E-UE can determine that the cell is barred (from R/E-UE's access). If the intraFreqReselection is set to 'not allowed', the R/E-UE that has barred from the corresponding cell can determine that the R/E-UE is not allowed to access to other cells in the same frequency as well. Regarding the cellBarred field format, a plurality of (different) cellBarred fields may be included in DCI for different UE types or for different specific feature(s). In addition, a plurality of (different) intraFreqReselection fields for different UE types or different specific feature(s) may be included in DCI. For example, a plurality of (different) cellBarred fields and a plurality of (different) intraFreqReselection fields may be included in DCI to indicate whether a 20 MHz UE and a 40 MHz UE are barred from cell access. Alternatively, a plurality of (different) cellBarred fields and a plurality of (different) intraFreqReselection fields may be included in DCI to indicate whether 1 Rx antenna port UE and 2 Rx antenna port UE are barred from cell access. Such information may be included in MIB or SIB1 (instead of/in addition to DCI).

TB1 and TB2 may be transmitted based on TDM using the same frequency resource of the same BWP. If DCI is configured to indicate K0 or SLIV, R/E-UE can determine the transmission position of TB2. Alternatively, the DCI-to-PDSCH (TB2) slot offset may not be indicated by DCI and may be pre-configured by MIB or a fixed value.

Alternatively, TB1 and TB2 may be transmitted based on FDM with different frequency resources of the same or different BWP. In this case, DCI may indicate BWP Id and frequency domain resource assignment. If DCI is configured to indicate K0 or SLIV, R/E-UE can determine the transmission position of TB2 in another frequency resource. Alternatively, the DCI-to-PDSCH (TB2) slot offset may not be indicated by DCI and may be pre-configured by MIB or a fixed value. In the case of FDM, R/E-UE may perform RF retuning to receive TB2 after receiving DCI, and DCI-to-PDSCH (TB2) slot offset should be configured to ensure sufficient time for UE.

Regarding the modulation and coding scheme (MCS) indicated by DCI, TB1 and TB2 may be configured to have the same MCS value. When TB2 and TB1 have different MCSs, DCI may separately indicate the MCS of TB2. In this case, for providing information about the MCS of TB2, the DCI may be configure to indicate only the MCS difference (offset) from the MCS of TB1.

BWP-id included in DCI indicates a BWP in which additional SIB1 transmission or separate R-SIB1 transmission is performed. In addition, DCI may inform not only the transmission resource of the legacy SIB1 for the N-UEs, but may also inform the transmission resource of the additional SIB1 for the R/E-UEs.

As mentioned above, R/E-UE may receive only TB1 or only TB2 or both TB1 and TB2 according to the DCI and decodes the TB(s), and obtains the SI message (SIBx or R-SIBx). If R-SIBx is transmitted in a corresponding cell, R/E-UE should receive R-SIBx. If R-SIBx is not transmitted in the corresponding cell, the R/E-UE can receive SIBx (instead). The R/E-UE determines whether R-SIBx is transmitted based on one or more SIB1, R-SIB1, and the DCI.

An R/E-UE or a base station configured to support R/E-UE may process/configure the reserved bit(s) of the DCI differently from an N-UE/legacy base station. However, there is a problem that the legacy base station is possible to incidentally configure the reserved bits as the same as a base station supporting an R/E-UE or specific feature(s). In this case, a problem may occur in that R/E-UE erroneously interprets reserved bit(s) of DCI. In order to solve this misinterpretation problem, the following methods are proposed.

Method 1: DCI Interpretation Based on Additional Transmission of SIB1 Scheduling PDCCH An R/E-UE or a base station configured to support R/E-UE may additionally transmit a SIB1 PDCCH (e.g., PDCCH carrying DCI for scheduling SIB1) in addition to the legacy SIB1 PDCCH transmission. For example, the number of repeated transmissions of the SIB1 PDCCH within 160 ms is increased by N times. Or the number of repeated transmissions of the SIB1 PDCCH is increased by N times within a period longer than 160 ms. The N value may be determined (differently) according to one or more of SSB/PDCCH SCS, SSB/PDCCH frequency range (FR1 or FR2), CORESET multiplexing pattern, and etc. In this case, the base station may perform additional PDCCH transmission in a manner of inverse of the legacy PDCCH transmission. For example, when legacy PDCCH transmits +1, the additional PDCCH may transmit −1. Similarly when the legacy PDCCH transmits −1, the additional PDCCH may transmit +1.

An R/E-UE can receive the additionally repeated SIB1 PDCCH transmission in addition to the legacy SIB1 PDCCH transmission. The UE determines at least one of the N value, additional SIB1 PDCCH transmission location and/or additional SIB1 PDCCH monitoring occasion, based on information obtained from MIB reception (e.g., one or more of SSB/PDCCH SCS or frequency range (FR1 or FR2), CORESET multiplexing pattern, etc.).

If additionally repeated SIB1 PDCCH transmission is detected at an additional SIB1 PDCCH transmission position or additional SIB1 PDCCH monitoring occasion, R/E-UE may assume that a specific bit (reserved bit(s)) of decoded DCI is configured to indicate whether an R/E-UE or specific feature(s) is supported by a corresponding cell. The UE may determine whether access to the cell is barred or allowed based on the value of the specific bit.

If additionally repeated SIB1 PDCCH transmission is not detected at an additional SIB1 PDCCH transmission position or additional SIB1 PDCCH monitoring occasion, R/E-UE may assume that the specific bit is not configured. In this case, R/E-UE does not decode the PDSCH for the SIB1 message and does not access to the cell (i.e., cell barred). Alternatively, without decoding the PDSCH for the new SIB1 message, after decoding the PDSCH for the legacy SIB1 message, R/E-UE may use configuration information in the legacy SIB1 message. In this case, whether access to the cell is barred is determined according to the configuration information in the legacy SIB1 message.

Method 2: DCI Interpretation Based on Additional SIB1 Information

Specific information can be included in the SIB1 message for an R/E-UE or a base station supporting specific feature(s). For example, the specific information for related to an R/E-UE or specific feature(s) may include at least one of the following parameters:

- An Indicator indicating whether the cell supports an R/E-UE or specific feature(s)
- An indicator indicating UE types supported by the cell
- An indicator indicating the specific feature(s) supported by the cell
- Configuration for specific feature(s) of the cell
- Configuration for an R/E-UE in the cell An R/E-UE can decode DCI during Type® PDCCH monitoring occasion, and determine whether a specific bit (reserved bit(s)) of decoded DCI configured to indicate support of an R/E-UE or specific feature(s). If the specific bit indicates the support of the R/E-UE or specific feature(s), the R/E-UE receives SIB1 scheduled by DCI. In this case, the SIB1 may be a legacy SIB1 for an N-UE, or a new SIB1 for an R/E-UE.

The R/E-UE determines whether the specific information is included in the received SIB1 message. If the specific information is included in the received SIB1 message, initial cell access may be performed by using the configuration information of the received SIB1 message. If the specific information is not included in the received SIB1 message, configuration information of the received SIB1 message is not used, and R/E-UE can determine that access to the cell is cell barred.

Or, if the specific information is not included in the received SIB1 message, the configuration information of the legacy SIB1 message may be used upon receiving the legacy SIB1 without using the configuration information of the new SIB1 message. In this case, whether to access to the cell is barred is determined according to the configuration information of the legacy SIB1 message.

Method 3: SFN Dependent-Bit Flipping for the Reserved Bit(s) Related to Cell Barring Indication If the N-UEs and R/E-UEs share the same PDCCH without additional transmission of SIB1, the reserved bit(s) of DCI for scheduling SIB1 can be used for indicating whether or not the cell supports the R/E-UE or specific feature(s).

Here, the existing bits of the DCI are remained same as before (NR Rel-15/16 operation), and the X reserved bit(s) may indicate support of the R/E-UE or specific feature and Y bit(s) out of X bits can be bit-flipped according to a certain rule. For example, in the case of DCI format 1_0 in which CRC is scrambled with SI-RNTI, there may be 17 reserved bits (i.e., X=17), and the base station configures 3 reserved bits (i.e., Y=3) out of 17 bits as specific bits to indicate support of the R/E-UE or specific feature(s). The 3 reserved bits can be bit flipped periodically. For example, the Y reserved bit(s) is set to a value indicating support of the R/E-UE, and is transmitted inversely during downlink transmission. However, the (X-Y) reserved bit(s) is transmitted without bit-flipping. The Y reserved bit(s) may correspond to the Y MSB or Y LSB of the X reserved bit(s). The Y value or position of the Y reserved bit(s) may be configured through SIB1 or other SIB, or may be a value fixed by the standard.

As detailed examples, following rules can be used.

1) Method 3-1: SFN(System Frame Number)-Based Bit Flipping

For example, the base station performs bit flipping (for all X reserved bit(s) or Y reserved bit(s)) according to the SFN number. For example, in a radio frame satisfying 'SFN mod 2=0', the base station transmits X or Y reserved bit(s) without bit flipping, and in a radio frame satisfying 'SFN mod 2=1', X or Y reserved can be transmitted with a bit-flipped value/bit(s).

The base station may perform bit flipping of X or Y reserved bit(s) for all beam indexes (e.g., SSB index) according to the above rule. Alternatively, bit flipping of X or Y reserved bit(s) may be alternately performed with respect to different beam indexes (e.g., SSB index) according to the above rule. For example, (i) in DCI transmission for an odd-numbered SSB index, X or Y reserved bit(s) is bit-flipped in a radio frame satisfying 'SFN mod 2=1', whereas (ii) in DCI transmission for an even-numbered SSB index, X or Y reserved bit(s) is bit-flipped in a radio frame satisfying SFN mod 2=0. In other radio frames, X or Y reserved bit(s) is transmitted with an original value without bit flipping.

2) Method 3-2: Type0 CSS Monitoring Occasion (MO) Based Bit Flipping

For example, the base station performs bit flipping for all X reserved bit(s) or Y reserved bit(s) at each specific PDCCH monitoring occasion. For example, bit flipping is performed for each slot in which the Type0 CSS monitoring occasion is configured. In every predetermined period (e.g., radio frame), the originally configured bit value is transmitted through X or Y reserved bit(s) in the odd-numbered MO in time domain, and bit-flipped value is transmitted in the even-numbered MO.

The base station may perform bit flipping for X or Y reserved bit(s) with respect to all beam indexes (e.g., SSB index) according to the above rule. Alternatively, bit flipping of X or Y reserved bit(s) may be alternately performed with respect to different beam indexes (e.g., SSB index) according to the above rule. For example, (i) in DCI transmission for an odd-numbered SSB index, X or Y reserved bit(s) is bit-flipped in the odd-numbered MO, and (ii) in DCI transmission for an even-numbered SSB index X or Y reserved bit(s) is bit-flipped in the even-numbered MO. In other MOs, X or Y reserved bit(s) is transmitted with the original value without bit flipping.

3) Method 3-3: Redundancy Version (RV) Based Bit Flipping

For example, the base station performs bit flipping of the X or Y reserved bit(s) based on at least one of the RV value or the HARQ retransmission order. For example, in DCI transmission for RV=0, 2, 4, . . . , X or Y reserved bit(s) is transmitted as the originally configured value, whereas for RV=1, 3, 5 . . . X or Y reserved bit(s) is bit-flipped. Or, in DCI transmission for 1st HARQ TX and 3rd HARQ TX, X or Y reserved bit(s) is transmitted as the originally configured value, whereas for 2nd HARQ TX and 4th HARQ TX, X or Y reserved bit(s) is bit-flipped.

The base station may perform bit flipping of X or Y reserved bit(s) for all beam indexes (e.g., SSB index) according to the above rule. Alternatively, bit flipping of X or Y reserved bit(s) may be alternately performed with respect to different beam indexes (e.g., SSB index) according to the above rule. For example, in DCI transmission for an odd-numbered SSB index, X or Y reserved bit(s) is bit-flipped in odd-numbered HARQ transmission, whereas in DCI transmission for an even-numbered SSB index, X or Y reserved bit(s) is bit-flipped in even-numbered HARQ transmission. In other HARQ transmissions, X or Y reserved bit(s) is transmitted with the originally configured value without bit flipping.

An R/E-UE can decode DCI transmitted in Type0 PDCCH monitoring occasion. Here, While decoding the DCI, the R/E-UE can check whether X or Y reserved bit(s) is bit-flipped. The R/E-UE can check whether the Y-bit (Y reserved bit(s)) is configured to indicate whether an R/E-UE or specific feature(s) is supported). If determined that R/E-UE is supported, R/E-UE receives SIB1 scheduled by DCI. In this case, SIB1 may be a legacy SIB1 for an N-UE, or a new SIB1 for an R/E-UE or specific feature(s).

The UE determines whether the specific information is included in the received SIB1 message. If the specific information is included in the received SIB1 message, initial cell access may be performed by using configuration information of the received SIB1 message. If the specific information is not included in the received SIB1 message, configuration information of the received SIB1 message is not used, and the R/E-UE may determine that access to the cell is cell barred.

Or, if the specific information is not included in the received SIB1 message, the configuration information of the legacy SIB1 message is used upon receiving the legacy SIB1 without using the configuration information of the new SIB1 message. In this case, whether access to the cell is barred is determined according to the configuration information of the legacy SIB1 message.

Method 4: Cell Access Barring Based on Neighbor Cell Information

For example, the base station may transmit specific information about specific neighboring cell(s), all cells of the same frequency, and/or all cells of a specific frequency. For example, the base station transmits at least the following specific information about a specific neighbor cell(s), all cells of the same frequency, and/or all cells of a specific frequency through a System Information Block (SIB), UE-only message, or RRC Release message:

An indicator indicating whether the cell supports an R/E-UE or specific feature(s)
An indicator indicating UE types supported by the cell
An indicator indicating specific feature(s) supported by the cell
Configuration for specific feature(s) in the cell
Configuration for an R/E-UE in the cell
Whether the Y reserved bit(s) of DCI in the corresponding cell indicates support of an R/E-UE or specific feature(s)

For example, if cell 2 is a cell corresponding to the specific information, an R/E-UE receiving the specific information in cell 1 can determine, in advance, that whether the Y reserved bit(s) of DCI indicates support of an R/E-UE or specific feature(s) in the cell 2 and/or whether cell 2 supports the R/E-UE. Accordingly, when cell 2 supports the R/E-UE and/or when the Y reserved bit(s) of DCI indicates that the R/E-UE is supported, the R/E-UE (re)selects cell 2. Otherwise, the R/E-UE determined that the R/E-UE is barred (at least temporarily) from cell 2 access. Alternatively, when Y reserved bit(s) of DCI indicates support of the R/E-UE in cell 2, the R/E-UE decodes DCI in consideration of Y reserved bit(s) in cell 2.

In an embodiment of the present invention, the R/E-UE can efficiently receive extended/additional system information. And, the R/E-UE can obtain system information successfully.

Figure 11:
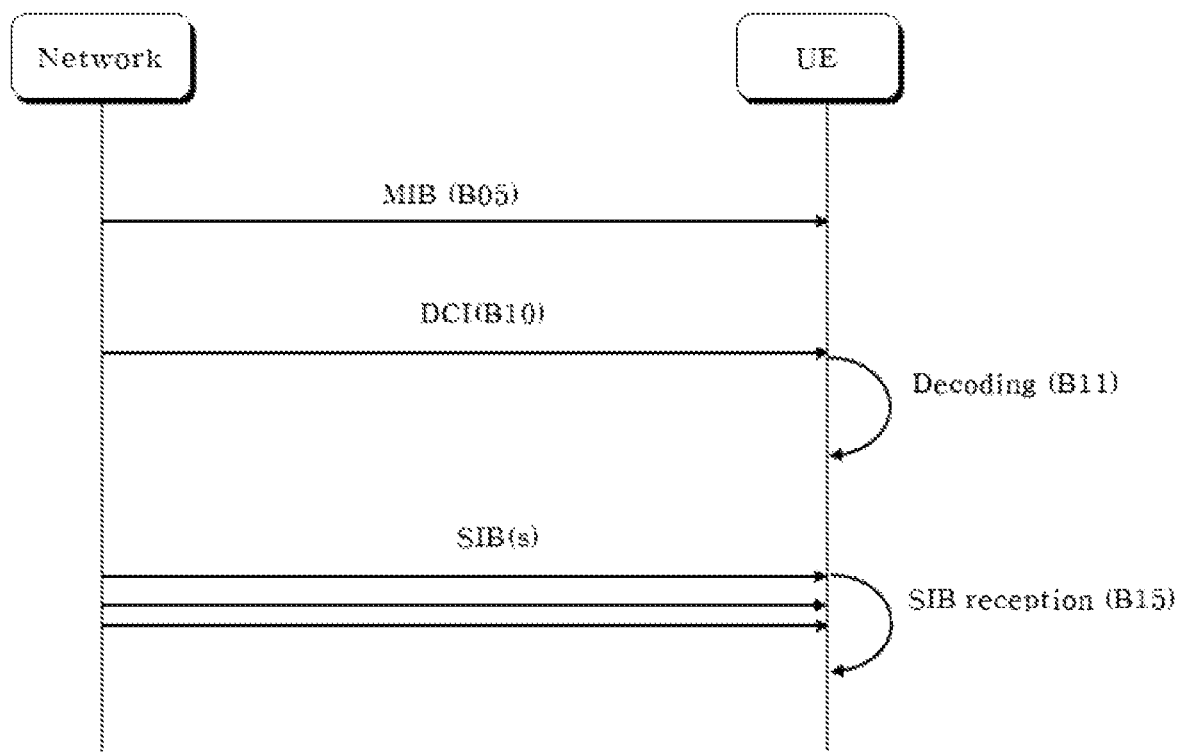
FIG. 11 illustrates a method of receiving a signal by a user equipment in an embodiment of the present invention.

FIG. 11 illustrates a method of receiving a signal by a user equipment in an embodiment of the present invention;

Referring to FIG. 11, UE can receive, from a first frequency band of a first cell, a master information block (MIB) as a part of system information of the first cell (B05).

UE can receive, from the first frequency band of the cell, a physical downlink control channel (PDCCH) carrying downlink control information (DCI) in a common search space configured based on the MIB (B10). Here, the DCI may include scheduling information for a first system information block (SIB) that is another part of the system information of the first cell UE can perform a system information block (SIB) reception based on the DCI (B15).

Preferably, the DCI may be configured to indicate whether or not the specific type of the UE is supported by the first cell.

Preferably, the SIB reception performed by the UE may include a reception of a second SIB based on whether or not the specific type of the UE is supported by the first cell.

Preferably, only in a state where the DCI indicates that the specific type of the UE is supported by the first cell, the SIB reception may include the reception of the second SIB, and the reception of the second SIB may be performed, based on the DCI, in a second frequency band that is not identical to the first frequency band Preferably, the specific type may be related to a UE with enhanced coverage or a UE with reduced-capability (RedCap) configured to support a smaller band than a legacy type UE.

Preferably, in the state where the DCI indicates that the specific type of the UE is supported by the first cell, the SIB reception may include the reception of the second SIB, in addition to the first SIB.

Preferably, the first SIB may be common for all UE types and the second SIB may be a specific type-dedicated SIB.

Preferably, the first SIB may include scheduling information for first remaining SIBs and the second SIB includes scheduling information for second remaining SIBs.

Preferably, the DCI may include information for barring cell-access of the specific type of the UE.

Preferably, the DCI may include time and frequency information for the second SIB.

Preferably, the SIB reception may exclude the reception of the first SIB, in the state where the DCI indicates that the specific type of the UE is supported by the first cell.

Preferably, in a state where the DCI indicates that the specific type of the UE is not supported by the first cell, the SIB reception performed by the UE includes neither the reception of the first SIB nor the reception of the second SIB.

Figure 12:
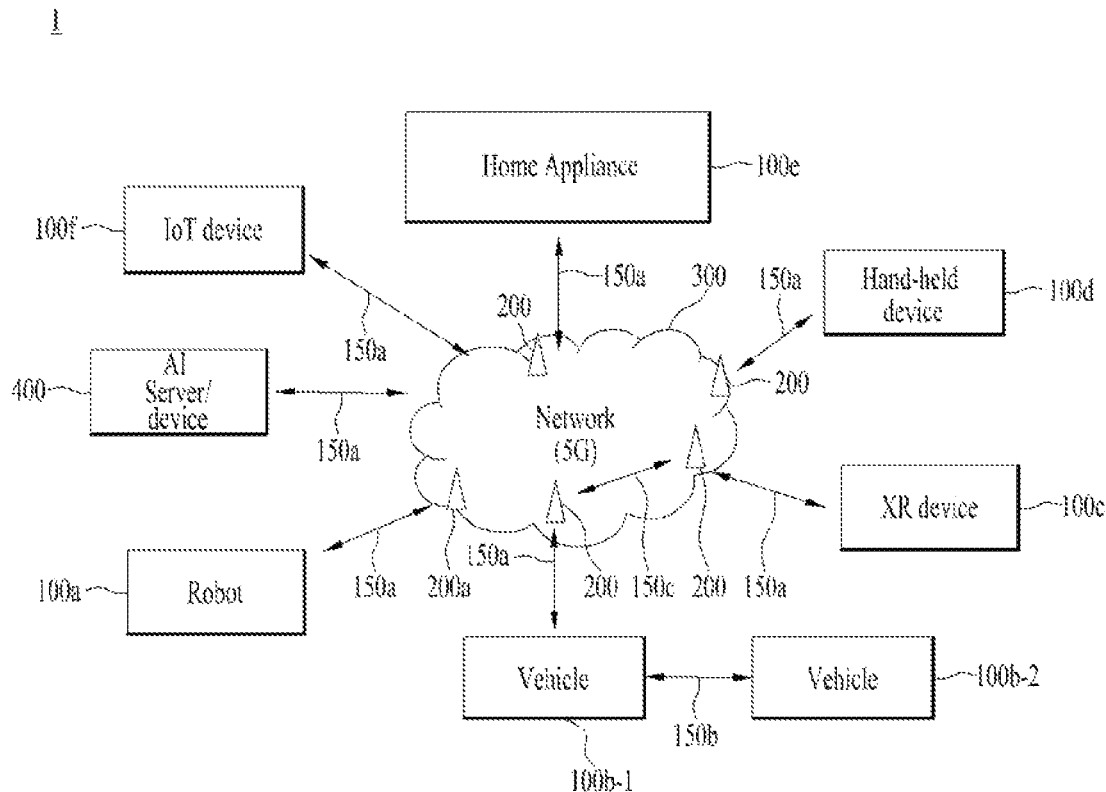
FIG. 12 to FIG. 15 illustrate a communication system 1 and wireless devices applied to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
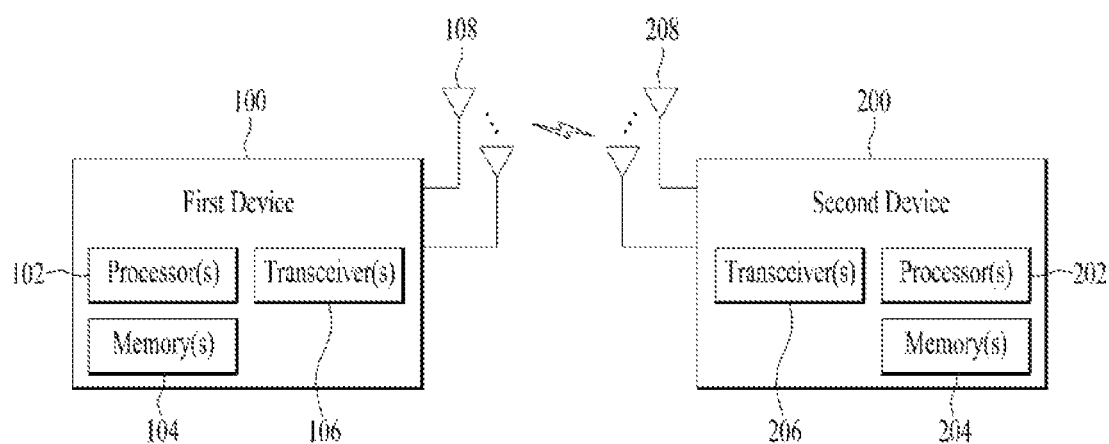

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
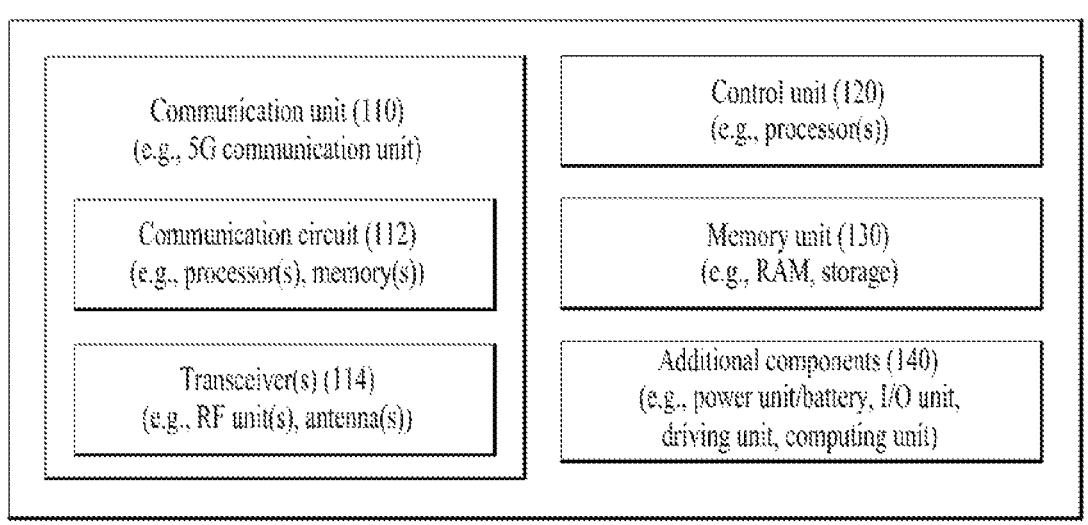

FIG. 14 illustrates another example of a wireless device applied to the present disclosure. The wireless device may be implemented in various forms according to a use-case/service (refer to FIG. 14).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
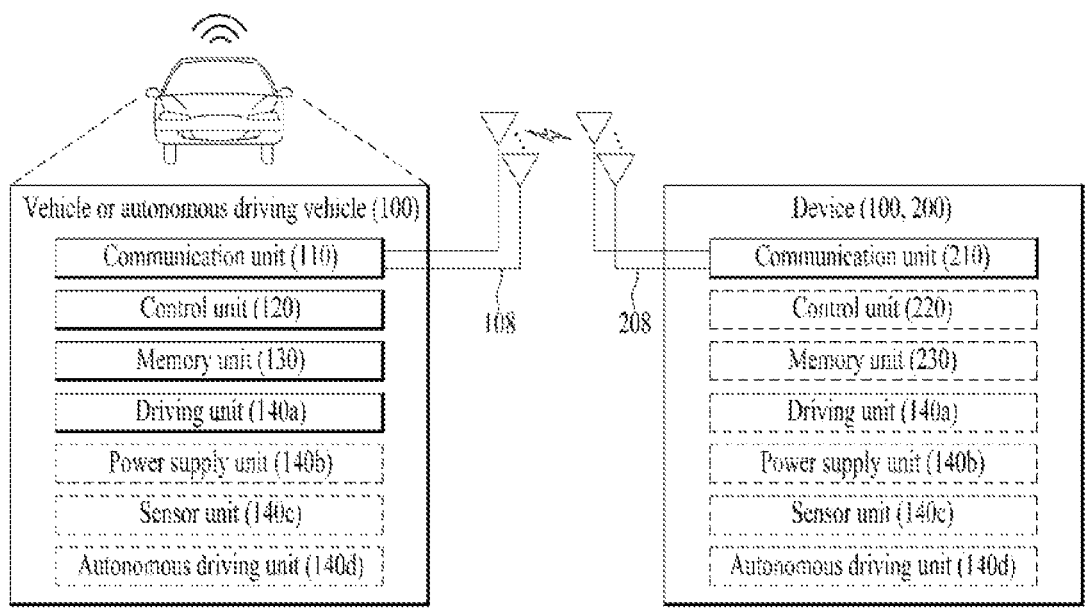

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
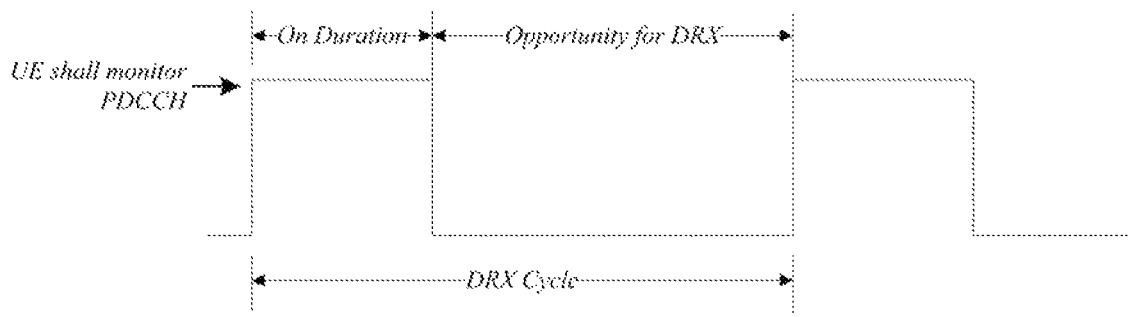
FIG. 16 illustrates an exemplary discontinuous reception (DRX) operation applied to the present disclosure.

FIG. 16 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 7

|  | Type of signals | UE procedure |
| --- | --- | --- |
| $1^{st}$ step | RRC signalling (MAC-CellGroupConfig) | Receive DRX configuration information |
| $2^{nd}$ Step | MAC CE((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of receiving a signal by a reduced capability (RedCap) user equipment (UE) having a UE maximum bandwidth smaller than a normal UE in a wireless communication system, the method comprising:
    receiving, from a first frequency band of a first cell, a master information block (MIB) as a part of system information of the first cell;
    receiving, from the first frequency band of the cell, a physical downlink control channel (PDCCH) carrying downlink control information (DCI) in a common search space configured based on the MIB, the DCI including scheduling information for a first system information block (SIB) that is another part of the system information of the first cell; and
    performing a system information block (SIB) reception based on the DCI,
    wherein Y bits among X reserved bits of the DCI are bit-flipped periodically to indicate whether or not the RedCap UE is supported by the first cell,
    wherein, based on the bit-flipped Y bits of the DCI indicating that the RedCap UE is supported by the first cell, the SIB reception includes a reception of a second SIB in a second frequency band different from the first frequency band, and
    wherein, based on the bit-flipped Y bits of the DCI indicating that the RedCap UE is not supported by the first cell, the SIB reception excludes the reception of the second SIB.

2. The method of claim 1, wherein, based on the bit-flipped Y bits of the DCI indicating that the RedCap UE is supported by the first cell, the SIB reception includes the reception of the second SIB, in addition to the first SIB.

3. The method of claim 2, wherein the first SIB is common for both the RedCap UE and the normal UE and the second SIB is dedicated to the RedCap UE.

4. The method of claim 2, wherein the first SIB includes scheduling information for first remaining SIBs and the second SIB includes scheduling information for second remaining SIBs.

5. The method of claim 1, wherein the DCI includes information related to barring cell-access of the RedCap UE.

6. The method of claim 1, wherein the DCI includes time and frequency information for the second SIB.

7. The method of claim 1, wherein, based on the bit-flipped Y bits of the DCI indicating that the RedCap UE is not supported by the first cell, the SIB reception excludes the reception of the first SIB.

8. A non-transitory computer readable medium recorded thereon program codes for performing the method according to claim 1.

9. A reduced capability (RedCap) user equipment (UE) having a UE maximum bandwidth smaller than a normal UE, the RedCap UE comprising:
    a memory configured to store instructions; and
    a processor configured to perform operations by executing the instructions, the operations comprising:
    receiving, from a first frequency band of a first cell, a master information block (MIB) as a part of system information of the first cell;
    receiving, from the first frequency band of the cell, a physical downlink control channel (PDCCH) carrying downlink control information (DCI) in a common search space configured based on the MIB, the DCI including scheduling information for a first system information block (SIB) that is another part of the system information of the first cell; and
    performing a system information block (SIB) reception based on the DCI,
    wherein Y bits among X reserved bits of the DCI are bit-flipped periodically to indicate whether or not the RedCap UE is supported by the first cell,
    wherein, based on the bit-flipped Y bits of the DCI indicating that the RedCap UE is supported by the first cell, the SIB reception includes a reception of a second SIB in a second frequency band different from the first frequency band, and wherein, based on the bit-flipped Y bits of the DCI indicating that the RedCap UE is not supported by the first cell, the SIB reception excludes the reception of the second SIB.

\* \* \* \* \*